Patented Mar. 24, 1925.

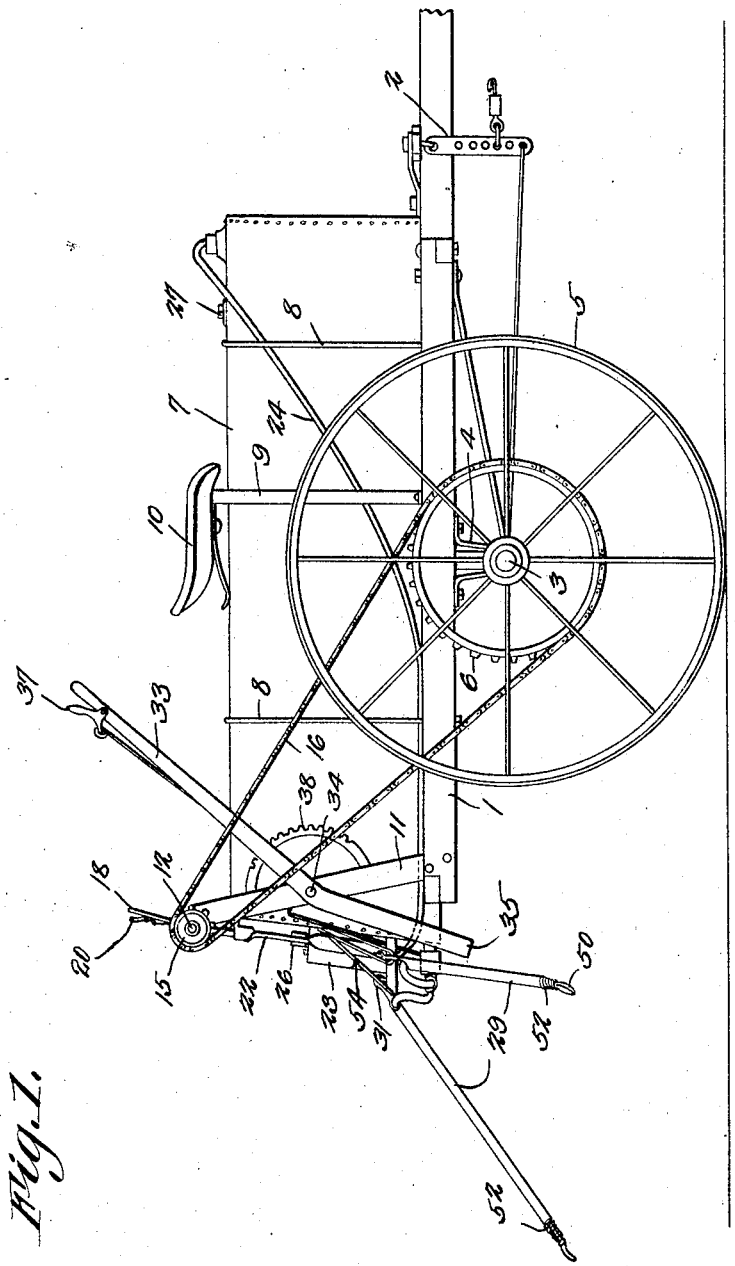

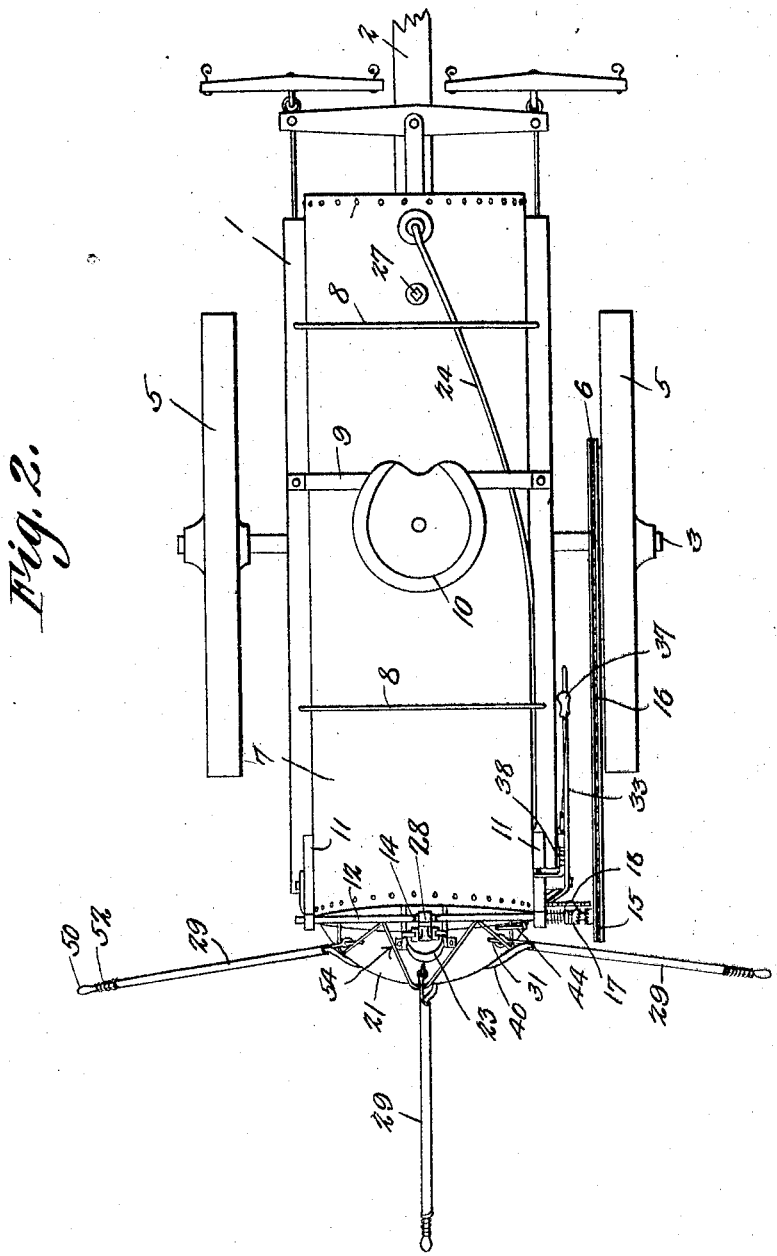

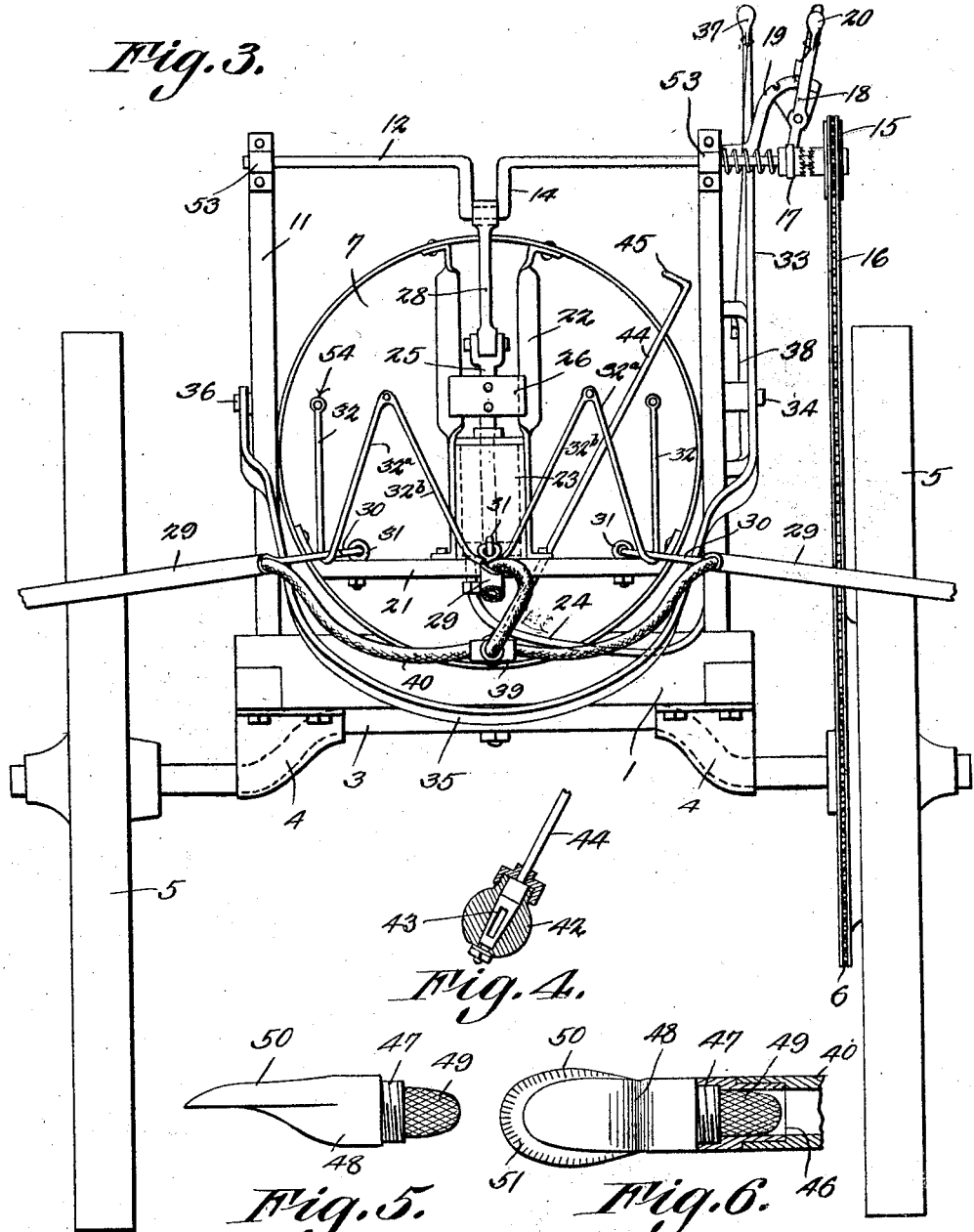

1,530,855

UNITED STATES PATENT OFFICE.

NAPOLEON JOE SALADINER, OF BRYAN, TEXAS.

LIQUID-POISON SPRAYER.

Application filed July 3, 1924. Serial No. 724,030.

*To all whom it may concern:*

Be it known that I, NAPOLEON J. SALADINER, a citizen of the United States, residing at Bryan, in the county of Brazos and State of Texas, have invented a new and useful Liquid-Poison Sprayer, of which the following is a specification.

The device forming the subject matter of this application is adapted to be employed for spraying liquid poison upon a standing crop, and the invention aims to provide novel means whereby a center row, and rows on opposite sides thereof, may be sprayed simultaneously, novel means being provided for manipulating the spraying members, and novel means being provided for securing air pressure in the tank on top of the liquid therein.

It is within the province of the disclosure to improve generally and to enhance the utility of devices of that sort to which the invention appertains.

Although a preferred embodiment has been shown, it will be understood that a mechanic, working within the scope of what is claimed, may make changes and alterations without in anywise departing from the spirit of the invention.

In the drawings:—Figure 1 shows, in side elevation, a device constructed in accordance with the invention; Figure 2 is a top plan; Figure 3 is a rear end elevation wherein parts are broken away, and wherein remote parts are omitted; Figure 4 is a sectional detail illustrating the valve; Figure 5 is a side elevation of the nozzle; Figure 6 is a plan wherein the nozzle is viewed at right angles to the showing of Figure 5, the nozzle being assembled with one of the flexible discharge tubes.

In carrying out the invention, there is provided a wheel-mounted vehicle, including a frame 1 provided at its forward end with any suitable draft means 2. An axle 3 extends transversely of the frame 1 intermediate the forward and rear ends of the frame and is secured to the frame as shown at 4. Ground wheels 5 are journaled on the ends of the axle 3, one of the ground wheels carrying a sprocket wheel 6. On the frame 1, a horizontal tank 7 is placed, the tank having a filling plug 27. The tank 7 may be held on the frame 1 of the vehicle by straps 8, or otherwise. A support 9 is carried by the frame 1 and straddles the tank 7, the support carrying a seat 10 disposed about in vertical alinement with the axle 30.

Upstanding and rearwardly inclined standards 11 are mounted on the frame 1 at the rear end thereof, and may be considered as part of the frame. On the upper portions of the standards 11, a horizontal shaft 12 is journaled in bearings 53, the shaft being equipped intermediate its ends with a crank 14. A sprocket wheel 15 is loose on one end of the shaft 12, a sprocket chain 16 being engaged with the sprocket wheels 15 and 6. The numeral 17 designates a clutch, operated by a lever 18 fulcrumed on a segment 19 carried by the standard 11 which is adjacent to the sprocket wheel 15, the lever having a latch mechanism 20 adapted to cooperate with the segment 19. The function of the clutch 17 is to connect the sprocket wheel 15 with the shaft 12, at the will of an operator.

A support 21, generally in the form of a horizontal platform, is connected to the rear end of the tank 7. Vertical guides 22 are connected at their lower ends to the platform 21 and at their upper ends to the tank 7, the guides slanting downwardly and rearwardly, as shown in Figure 1. A pump cylinder 23 is secured to the platform 21 and is located between, and sustained by, the lower ends of the guides 22. From the pump cylinder 23, a conduit 24 extends to the upper front portion of the tank 7. The piston rod for the pump cylinder 23 is marked by the numeral 25 and carries a cross head 26 mounted to reciprocate on the guides 22. The lower end of a pitman 28 is pivoted to the upper end of the piston rod 25, the upper end of the pitman being mounted on the crank 14 of the shaft 12.

Rigid tubular carriers 29 are supplied, and are provided at their inner ends with arms 30, pivotally mounted at 31 on the platform 21 in such a way that the carriers may have a compound vertical and horizontal movement. A zig-zag bracket 54 is secured to the rear end of the tank 7 and slants downwardly and rearwardly. The bracket 54 includes substantially vertical arms 32, downwardly and laterally inclined arms 32$^a$, joined at their lower ends to the lower ends of the arms 32, and converging arms 32$^b$, connected together at their lower ends, and connected at their upper ends to the arms 32$^a$ of the bracket 54. The arms or extensions 30 of the side carriers 29 are adapted to slide downwardly and outwardly on the parts 32ª, whereas the extension or arm 30 of the middle carrier is adapted to be guided downwardly by the arms 32ᵇ of the bracket, into the central position shown in Figure 2.

Passing to the means whereby the carriers 29 are raised and lowered, it will be observed that, in Figure 1, a vertically movable lever 33 is fulcrumed at 34 on the standard 11 which is adjacent to the sprocket wheel 15, the lever having a loop-shaped foot 35, the side portions of the foot converging as they extend downwardly. That end of the foot 35 which is remote from the lever 33 is pivoted at 36 to the standard 11 which is remote from the sprocket wheel 15, all of which will be understood readily when Figures 3 and 1 are compared. The lever 33 is equipped with a latch mechanism 37 adapted to cooperate with a segment 38 on the standard 11 which is adjacent to the sprocket wheel 15.

A coupling 39 communicates with the rear end of the tank 7, and in the coupling, a casing 42 is interposed, a quick-closing valve 43 being journaled in the casing, and having a stem 44 which is upwardly and laterally inclined, the stem terminating in a handle 45 located near to the working ends of the levers 33 and 18. Flexible tubes 40 extend through the rigid tubular carriers 29 and are in communication, at their inner ends, with the coupling 39. Couplings 46 are mounted in the rear ends of the tubes 40 and receive the necks 47 of the heads 48 of discharge nozzles, the neck 47 of each nozzle carrying a screen 49. Each nozzle head 48 has a hollow spoon-like extension 50 provided in its edges with ribs or slits 51. Compression springs 52 surround the ends of the tubes 40, the inner ends of the springs abutting against the ends of the tubular carriers 29, and the outer ends of the springs abutting against the nozzles, to hold them in alinement with the carriers 29, as shown in Figure 1.

In practical operation, the lever 18 and the clutch 17 may be operated to couple the sprocket wheel 15 to the shaft 12, and, then, there is established an operating train for the pump, the train including one of the ground wheels 5, the sprocket wheel 6, the chain 16, the sprocket wheel 15, the shaft 12, the crank 14, and the pitman 28, the piston rod 25 being caused to reciprocate in the pump cylinder 23, and air being forced through the conduit 24 into the tank 7, on top of the liquid in the tank. The air pressure thus attained forces liquid in the tank through the casing 42 and the coupling 39, under the governance of the valve 43, the valve being operated by means of the stem 44. The liquid proceeds from the coupling 39 through the tubes 40 and, being dispersed through the slits 51 in the spoon-like extensions 50 of the nozzles, is discharged rearwardly from the center nozzle, and laterally from the side nozzles, when the parts are arranged as shown in Figure 2, a wide belt of standing plants thus being supplied with the liquid which is stored in the tank 7.

The way in which the tubular carriers 29 are supported by the bracket 54, when the machine is in operation, has been explained hereinbefore. Assuming that the carriers 29 are arranged as shown in Figure 2, it will be obvious that when the lever 33 is swung downwardly at its forward end, the loop-shaped foot 35 of the lever will raise the carriers 29 and tend to swing them together toward the longitudinal central plane of the vehicle, the latch mechanism 37 on the lever 33 being engaged with the segment 38 to hold the carriers 29 uplifted. When the lever 33 is manipulated to swing the foot 35 downwardly, the nozzle carriers 29 are lowered, the parts 32ª of the bracket 54 causing the side carriers to swing laterally and outwardly, as the parts 30 of the carriers traverse the arms 32ª of the bracket, the part 32ᵇ of the bracket carrying the central member 29 into a position in alinement with the longitudinal median plane of the vehicle, as shown in Figure 2.

I claim:—

1. In a device of the class described, a wheel-mounted vehicle, a tank thereon, central and side nozzle carriers pivotally connected to the tank for vertical and horizontal movement, means for raising and lowering the carriers, means for directing the side carriers laterally and outwardly, as they are lowered, and means for centralizing the central carrier as it is lowered.

2. In a device of the class described, a wheel-mounted vehicle, a tank thereon, central and side nozzle carriers pivotally connected to the tank for vertical and horizontal movement, means for directing the side carriers laterally and outwardly, as they are lowered, means for centralizing the central carrier as it is lowered, and a lever fulcrumed on the vehicle and provided with a loop-shaped foot extended about the carriers.

3. A device of the class described, constructed as set forth in claim 2, and further characterized by the fact that the end of the foot which is remote from the lever is mounted pivotally on the vehicle.

4. In a device of the class described, a wheel-mounted vehicle, a tank thereon, rigid carriers pivotally mounted on the vehicle for compound horizontal and vertical movement, tubes supported by the carriers and communicating with the tank, means for raising and lowering the carriers, and means for guiding the carriers laterally and outwardly in opposite directions, when they are lowered.

5. In a device of the class described, a frame, a tank on the frame, a ground wheel journaled on the frame, a rearwardly extended platform on the tank, a pump on the platform and communicating with the tank, means for connecting the pump operatively with the ground wheel, nozzle carriers pivoted to the platform for compound vertical and horizontal movement, means for raising and lowering the carriers, and means for directing the carriers laterally and outwardly as they are lowered.

In testimony that I claim the foregoing as my own, I have hereto affixed my signature in the presence of two witnesses.

NAPOLEON JOE SALADINER.

Witnesses:
F. L. HENDERSON,
J. B. HICKMAN.